(12) United States Patent
LeBlanc et al.

(10) Patent No.: US 8,428,419 B2
(45) Date of Patent: Apr. 23, 2013

(54) FIBER DISTRIBUTION HUB WITH INTERNAL CABLE SPOOL

(75) Inventors: Thomas G. LeBlanc, Westminster, MA (US); Soutsada Vongseng, Chanhassen, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 360 days.

(21) Appl. No.: 12/888,567

(22) Filed: Sep. 23, 2010

(65) Prior Publication Data

US 2011/0103761 A1    May 5, 2011

Related U.S. Application Data

(60) Provisional application No. 61/245,082, filed on Sep. 23, 2009.

(51) Int. Cl.
*G02B 6/00* (2006.01)
(52) U.S. Cl.
USPC .............................. 385/135; 385/24; 385/134
(58) Field of Classification Search .................... 385/24, 385/134–136
See application file for complete search history.

(56) References Cited

U.S. PATENT DOCUMENTS

| | | | |
|---|---|---|---|
| 6,220,413 B1 | 4/2001 | Walters et al. | |
| 6,522,826 B2 | 2/2003 | Gregory | |
| 6,983,095 B2 | 1/2006 | Reagan et al. | |
| 7,198,409 B2 | 4/2007 | Smith et al. | |
| 7,200,317 B2 | 4/2007 | Reagan et al. | |
| 7,218,827 B2 | 5/2007 | Vongseng et al. | |
| 7,233,731 B2 | 6/2007 | Solheid et al. | |
| 7,315,681 B2 | 1/2008 | Kewitsch | |
| 7,369,741 B2 | 5/2008 | Reagan et al. | |
| 7,418,181 B2 | 8/2008 | Zimmel et al. | |
| 7,548,679 B2 | 6/2009 | Hirano et al. | |
| 7,711,234 B2 | 5/2010 | Smith et al. | |
| 7,715,679 B2 | 5/2010 | Kowalczyk et al. | |
| 7,720,343 B2 | 5/2010 | Barth et al. | |
| 7,756,379 B2 | 7/2010 | Kowalczyk et al. | |
| 7,816,602 B2 | 10/2010 | Landry et al. | |
| 7,869,682 B2 | 1/2011 | Kowalczyk et al. | |
| 8,131,126 B2 * | 3/2012 | Kowalczyk et al. | 385/135 |
| 2008/0292261 A1 * | 11/2008 | Kowalczyk et al. | 385/135 |
| 2009/0294016 A1 | 12/2009 | Sayres et al. | |
| 2009/0317047 A1 | 12/2009 | Smith et al. | |

(Continued)

OTHER PUBLICATIONS

Fiber Optic Cable Shop, "Network Interface Card, PCI, combo 10/100Mb Ethernet & 100Mb MM Fiber", dated Apr. 24, 2009, 1 pg.
Intel® PRO Server Adapters,© 2001, 2 pages.

*Primary Examiner* — Brian Healy
*Assistant Examiner* — Mary El Shammaa
(74) *Attorney, Agent, or Firm* — Merchant & Gould P.C.

(57) ABSTRACT

A fiber distribution hub (FDH) includes an internal spool for wrapping a fiber optic cable. The internal spool is adapted to rotate within the FDH and thereby pay out or retrieve the fiber optic cable from/to the FDH. A first end of the fiber optic cable can be extended through an entrance location of the FDH and can be further extended beyond the FDH to a connection point. The second end of the fiber optic cable can be connected to a fiber optic adapter within the FDH and can be disconnected from the fiber optic adapter when the internal spool is rotated. The fiber optic cable can be a fiber optic feeder cable.

29 Claims, 13 Drawing Sheets

U.S. PATENT DOCUMENTS

2010/0074587 A1 3/2010 Loeffelholz et al.
2010/0247051 A1* 9/2010 Kowalczyk et al. .......... 385/135
2011/0044599 A1 2/2011 Kowalczyk et al.
2011/0158598 A1 6/2011 LeBlanc et al.

* cited by examiner

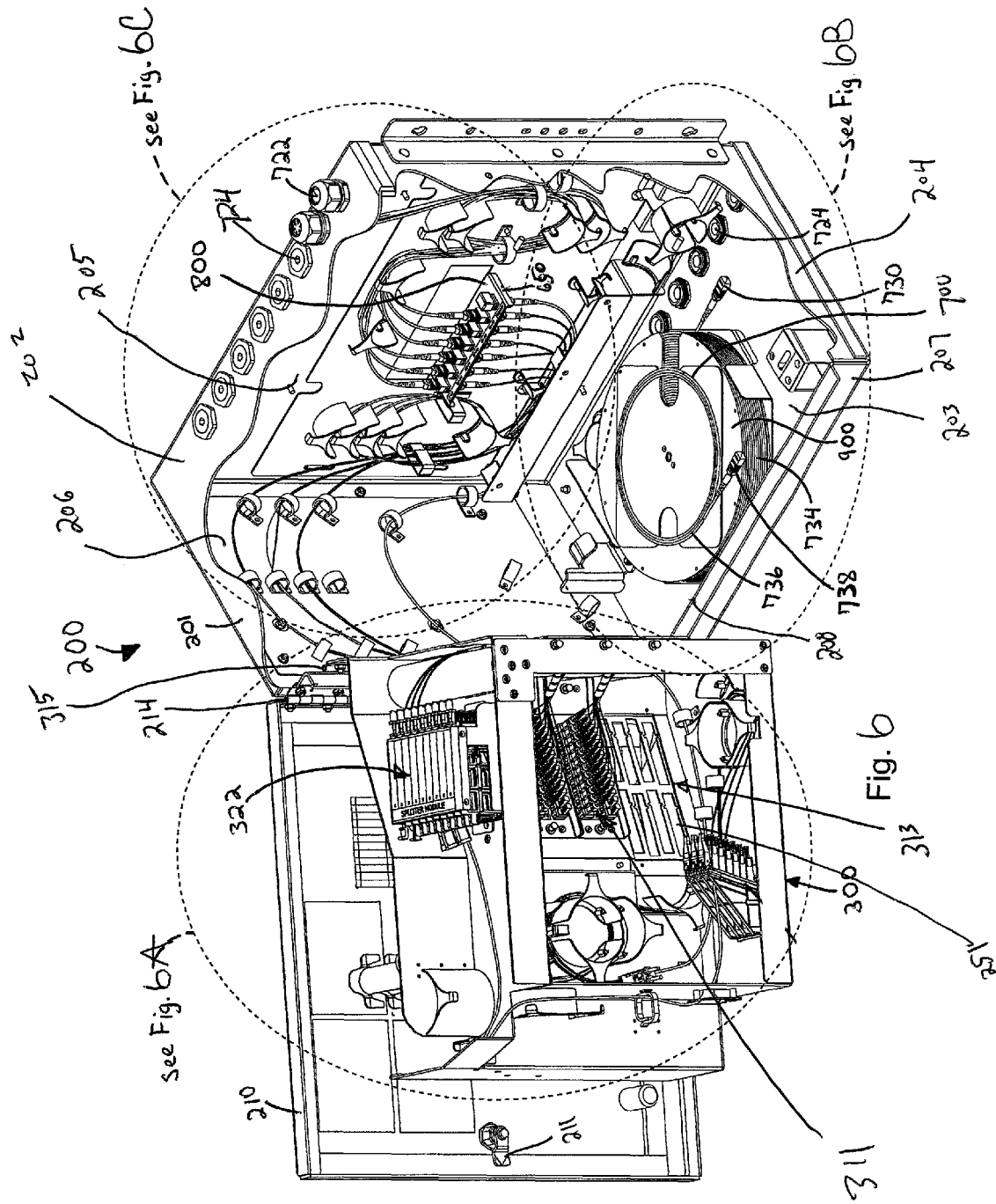

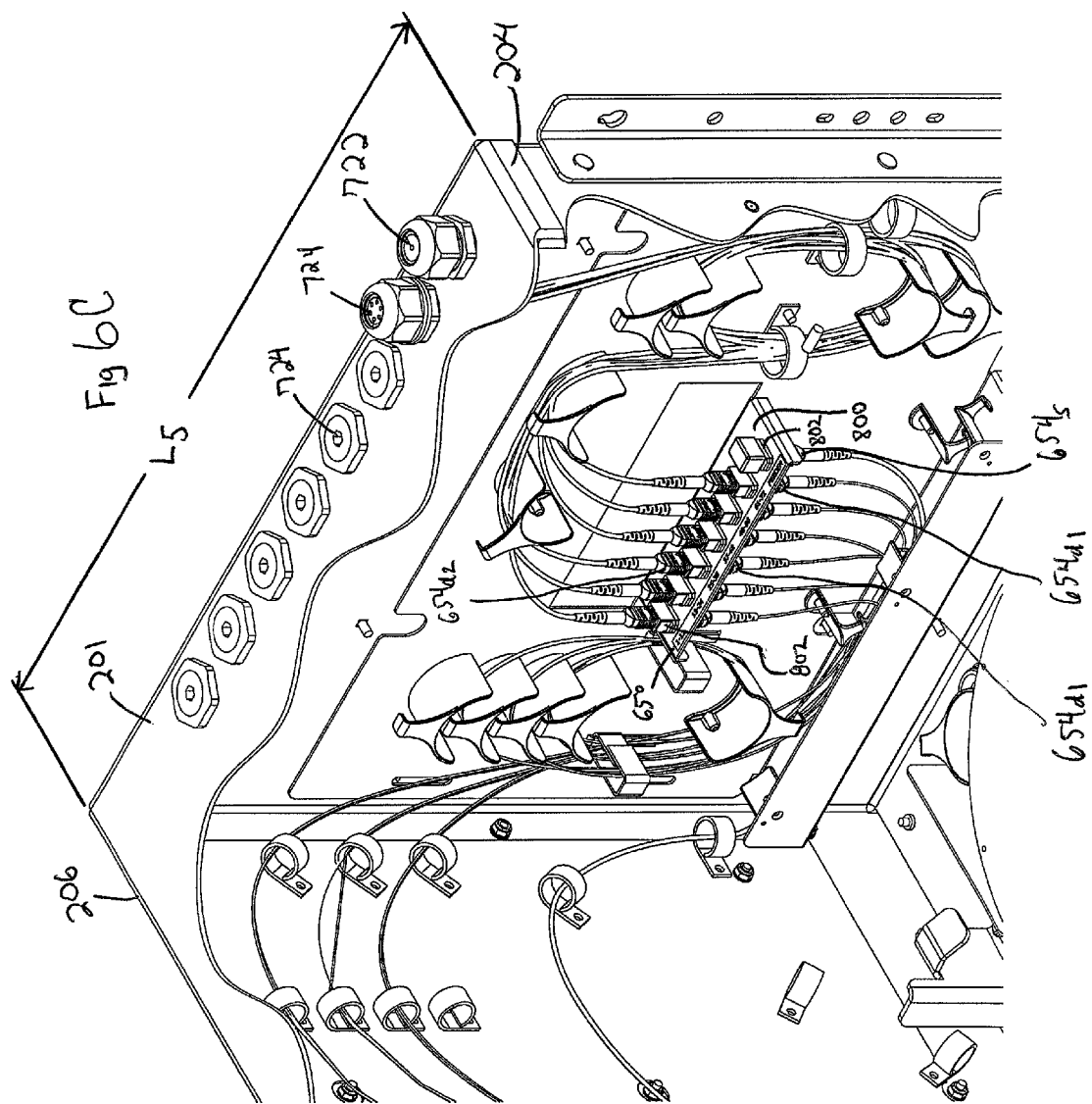

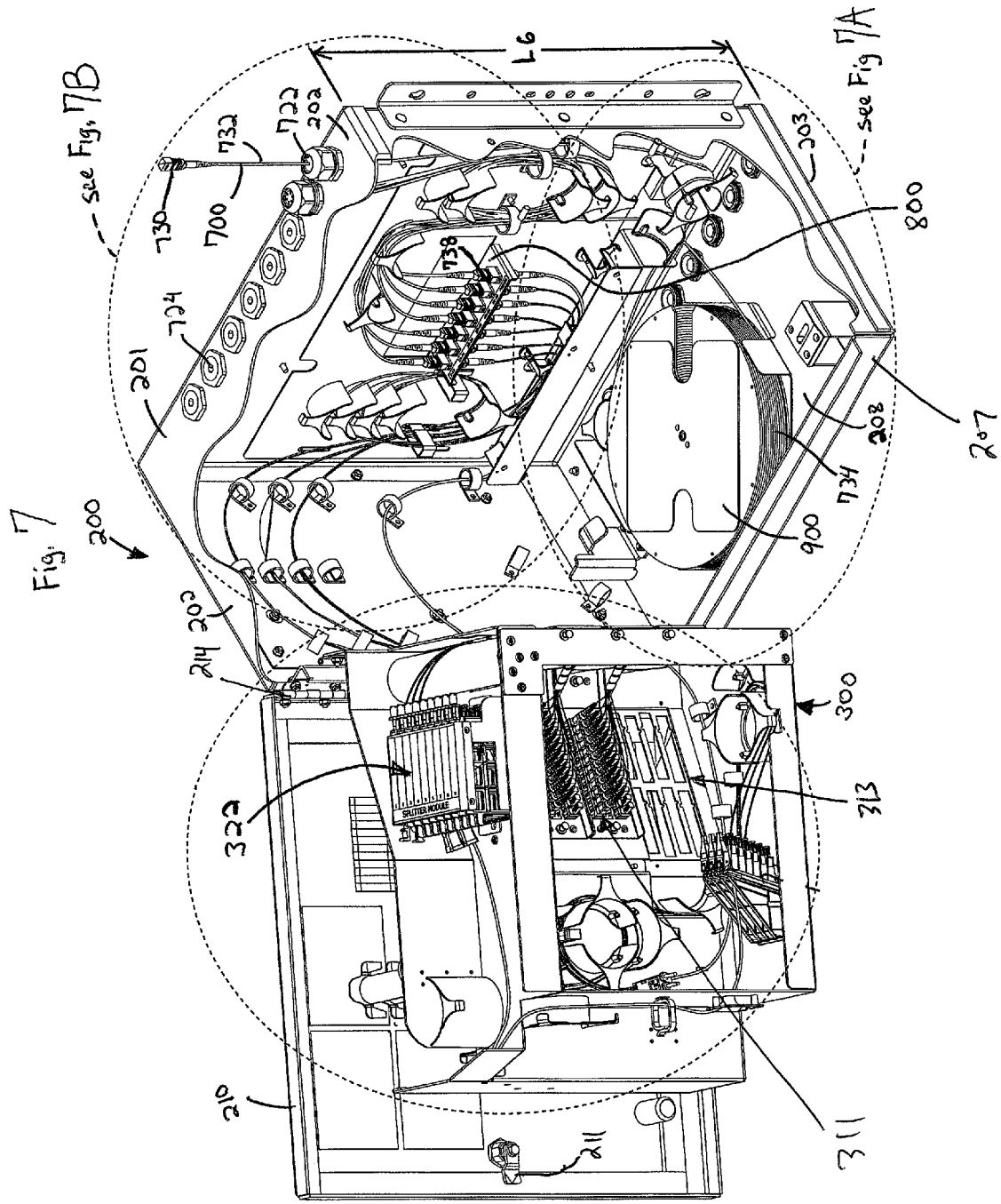

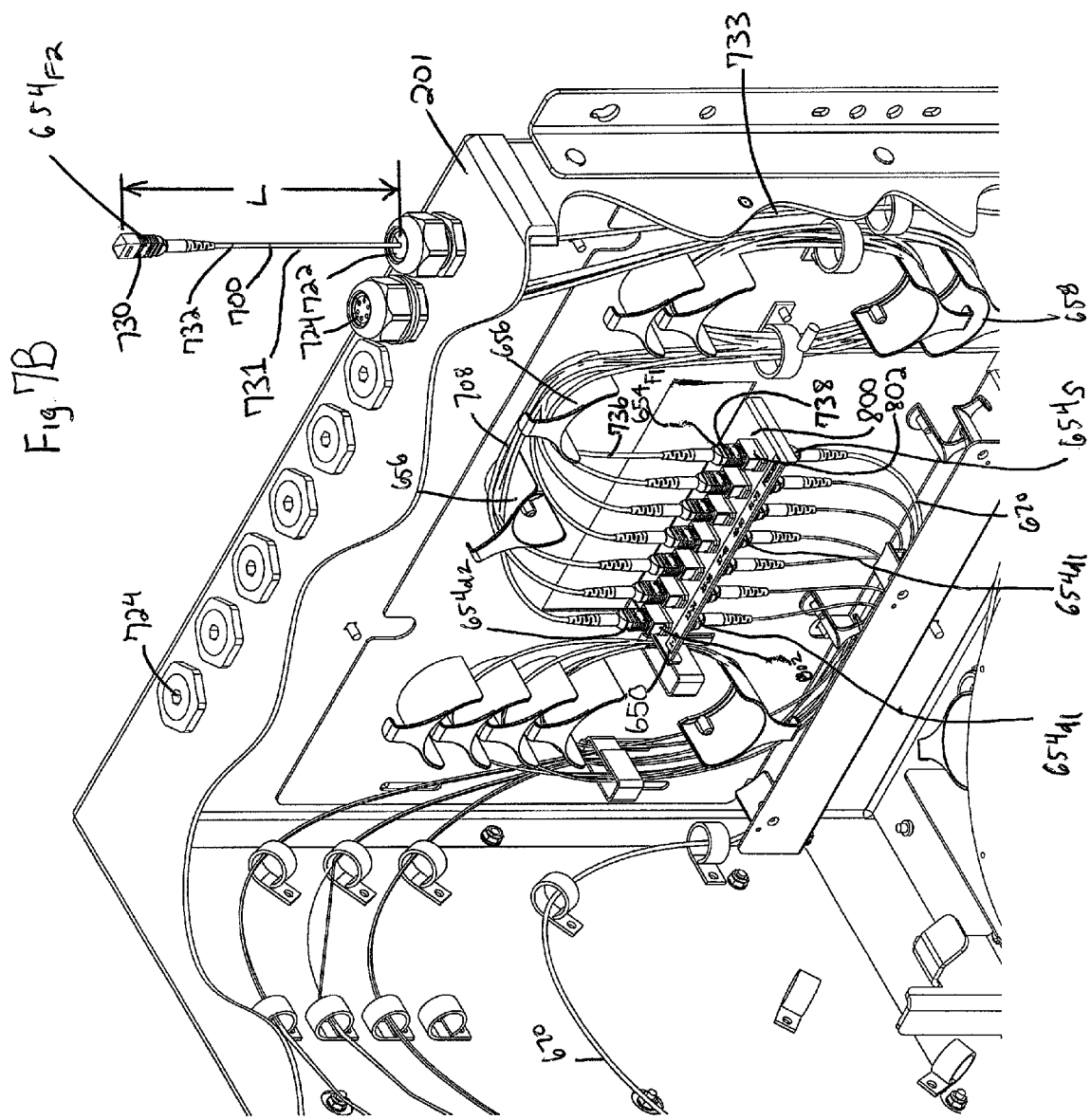

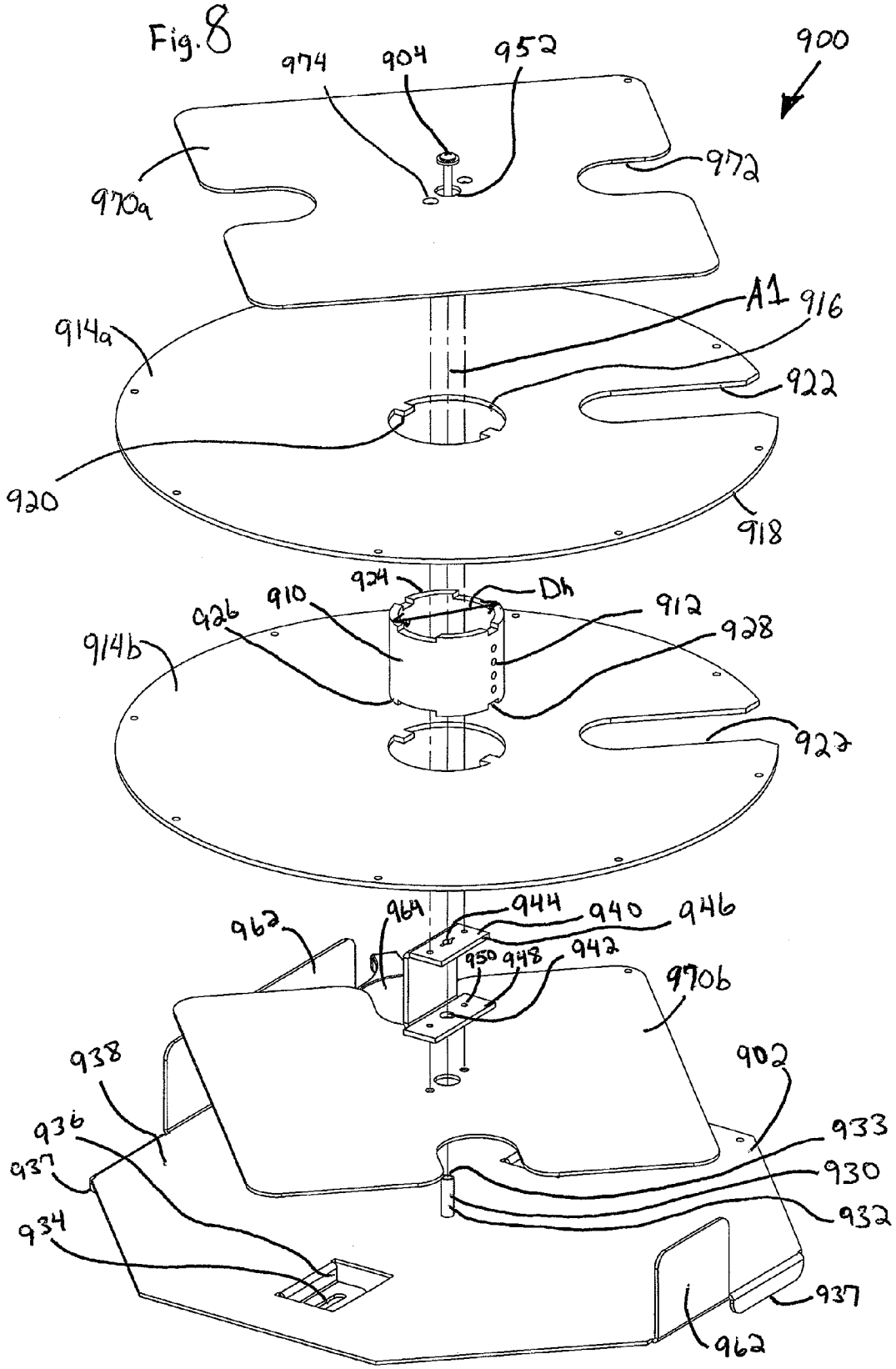

FIBER DISTRIBUTION HUB WITH INTERNAL CABLE SPOOL

CROSS-REFERENCE TO RELATED APPLICATION

This application claims the benefit of U.S. Provisional Patent Application Ser. No. 61/245,082, filed Sep. 23, 2009, which application is hereby incorporated by reference in its entirety.

TECHNICAL FIELD

The principles disclosed herein relate to fiber optic cable and other cable distribution systems. More particularly, the present disclosure relates to distributing fiber optic cables and related signals within a network including provisions to deploy the network components.

BACKGROUND

Optical networks, including passive optical networks, are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

Fiber distribution hubs (i.e., FDHs) have been developed for optical networks. Within an FDH, incoming optical fibers, from a central office, can be connected to outgoing optical fibers, leading to the end users, forming an optical signal connection. FDHs typically include optical splitters capable of solitary input signals originating from the central office into output signals that are directed to subscriber locations. The splitters allow a given FDH to service a significantly longer number of subscribers than the number of input fibers routed to the FDH.

The incoming optical fibers to an FDH can be provided within a feeder cable. Various FDHs can be installed at various installations and the routes, and therefore the lengths, of the feeder cables, connected to their respective FDHs, can vary. As a result, there is a need for an FDH that can effectively manage the varying lengths of the feeder cables. The present disclosure satisfies this and other needs.

SUMMARY

Certain aspects of the present disclosure relate to systems and methods for paying out fiber optic cables from a cabinet of a fiber distribution hub. The present disclosure also relates to systems and methods for drawing fiber optic cables into a cabinet of a fiber distribution hub. Other aspects relates to a fiber distribution hub having an internal spool that can spin within a cabinet of the fiber distribution hub to allow fiber optics cable to be paid out from the fiber distribution hub.

A variety of additional aspects will be set forth in the description that follows. The aspects can relate to individual features and to combinations of features. It is to be understood that both the forgoing general description and the following detailed description are exemplary and explanatory only and are not restrictive of the broad concepts upon which the embodiments disclosed herein are based.

BRIEF DESCRIPTION OF THE DRAWINGS

FIG. 6 is a perspective view of a fiber distribution hub including a cable spool mounted within a cabinet;

FIG. 6C is an enlarged portion of FIG. 6;

FIG. 7 is a perspective view of the fiber distribution hub of FIG. 6 with a first end of a cable of the cable spool connected to a fiber optic adapter within the cabinet and a second end of the cable deployed outside the cabinet.

FIG. 7B is another enlarged portion of FIG. 7; and

FIG. 8 is an exploded perspective view of the cable spool of FIG. 6.

DETAILED DESCRIPTION

Figure 1:
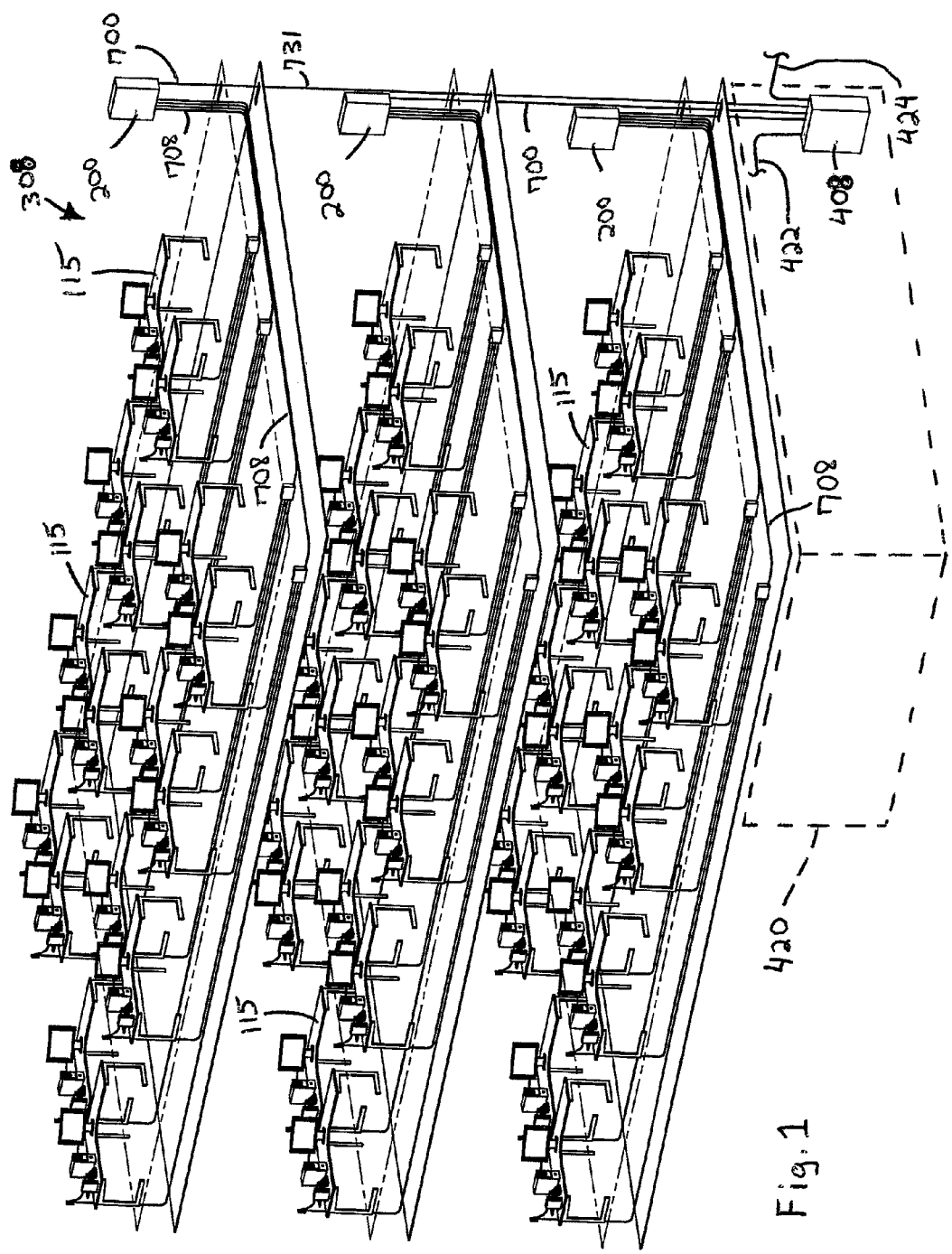
FIG. 1 is a schematic isometric view of a fiber optic distribution system including a plurality of service zones each serviced by a fiber distribution hub.

The present disclosure relates to fiber optic cable systems. In particular, an example fiber optic distribution system includes one or more fiber distribution hubs 200 (FDHs) that provide an interface between a central office 110 and subscribers 115 (see FIG. 5). In certain embodiments, an intermediate data center 420 (e.g., a data room or location in a multi-dwelling unit or office building) is located between the central office 110 and the FDHs 200.

The FDH 200 can be configured for various installations including indoor installations, outdoor installations, pole mounted installations, wall mounted installations, etc. FIGS. 1-4 illustrate an indoor FDH 200 adapted for use in an indoor environment (e.g., mounted in a data closet, a basement, a computer room, the data center 420, etc.). The FDH 200 contains terminated incoming fibers, coming directly or indirectly from the central office 110 and/or the data center 420, and terminated outgoing fibers going directly or indirectly to one of the subscribers 115 and/or the data center 420. The subscriber 115 can be a residential dwelling, a commercial office, a desktop computer, a telephone, a videophone, a television, or other device connected to the fiber optic distribution system.

Figure 2:
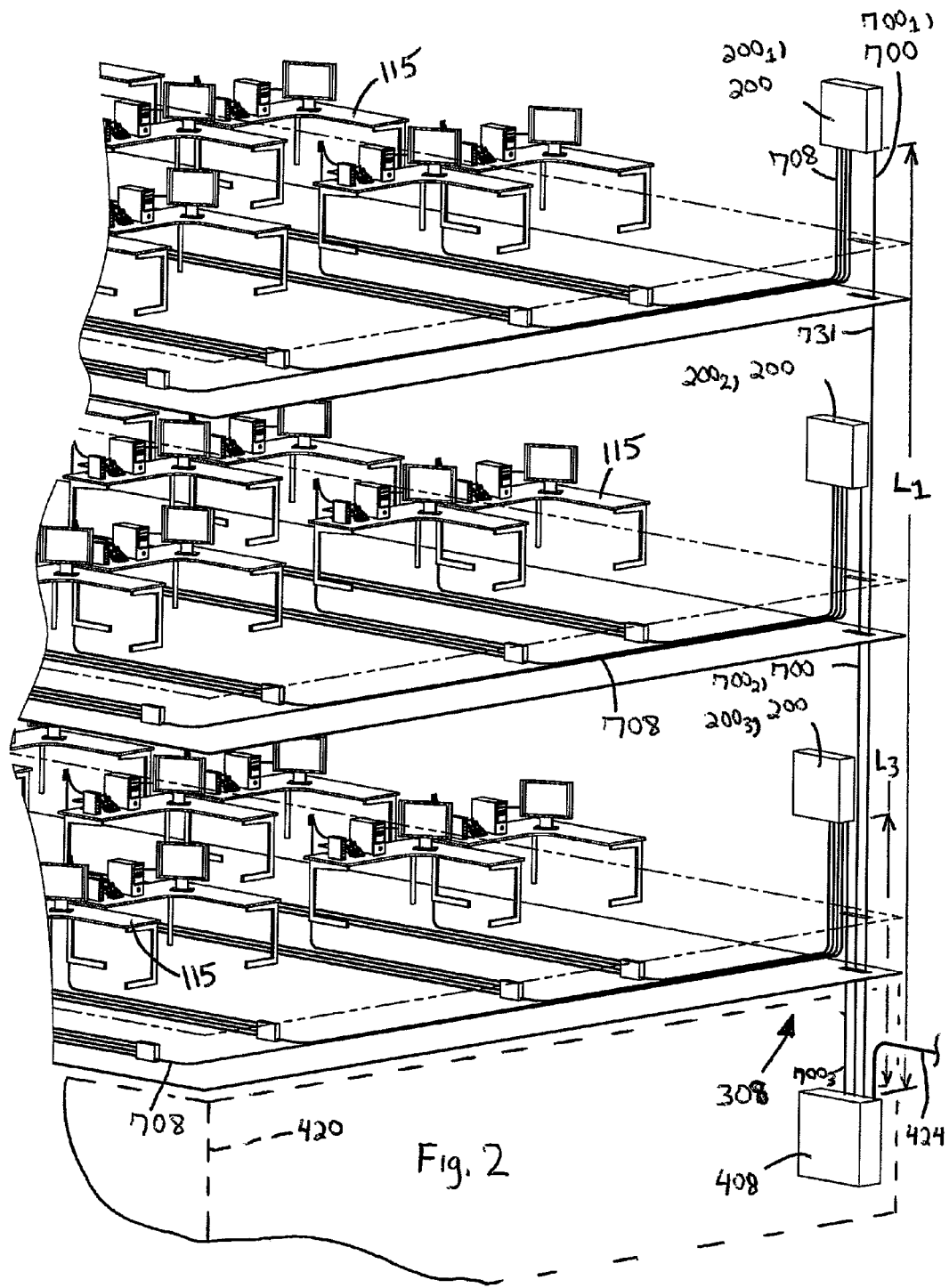
FIG. 2 is an enlarged portion of FIG. 1.
Figure 3:
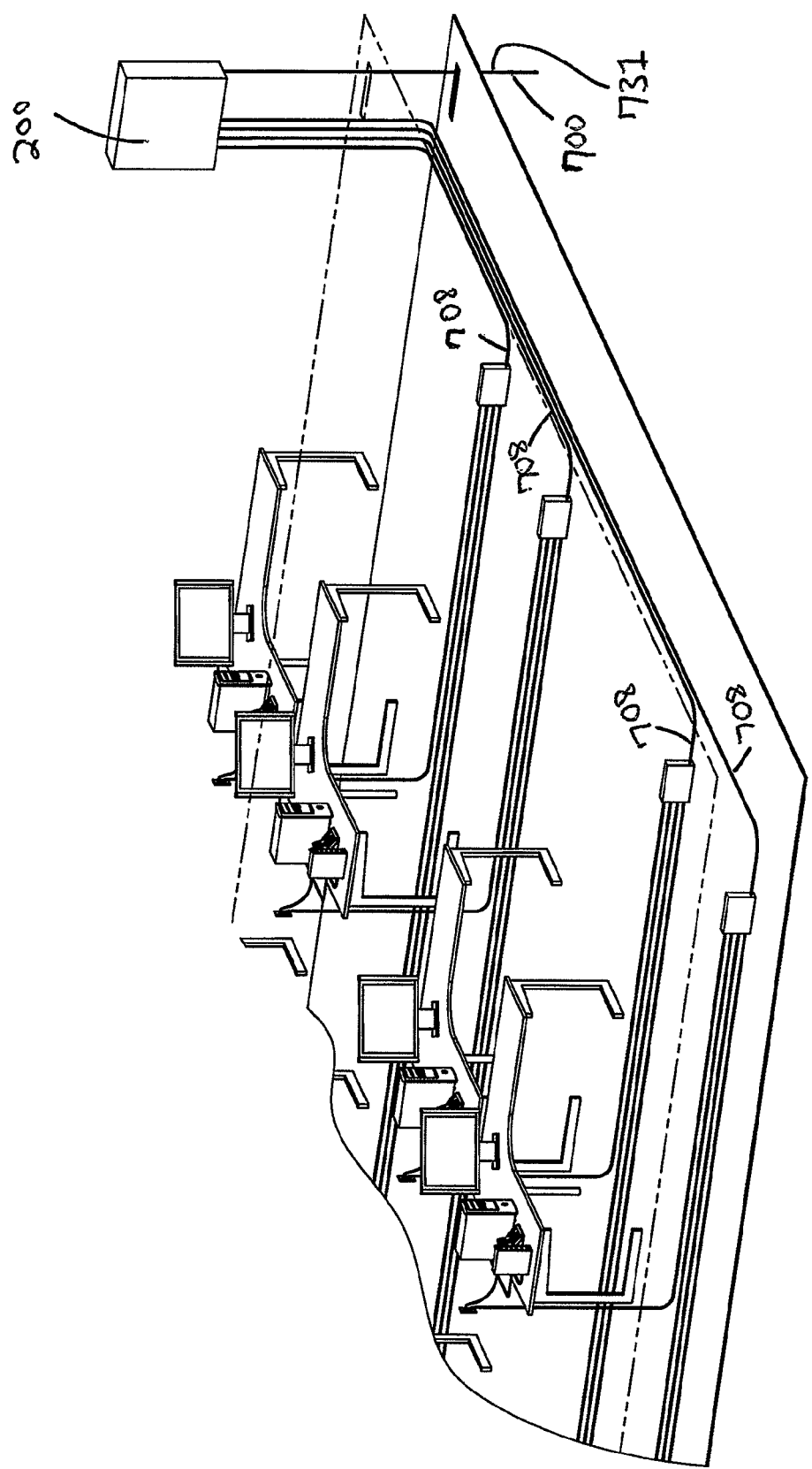
FIG. 3 is an enlarged portion of one of the service zones of FIG. 1.
Figure 4:
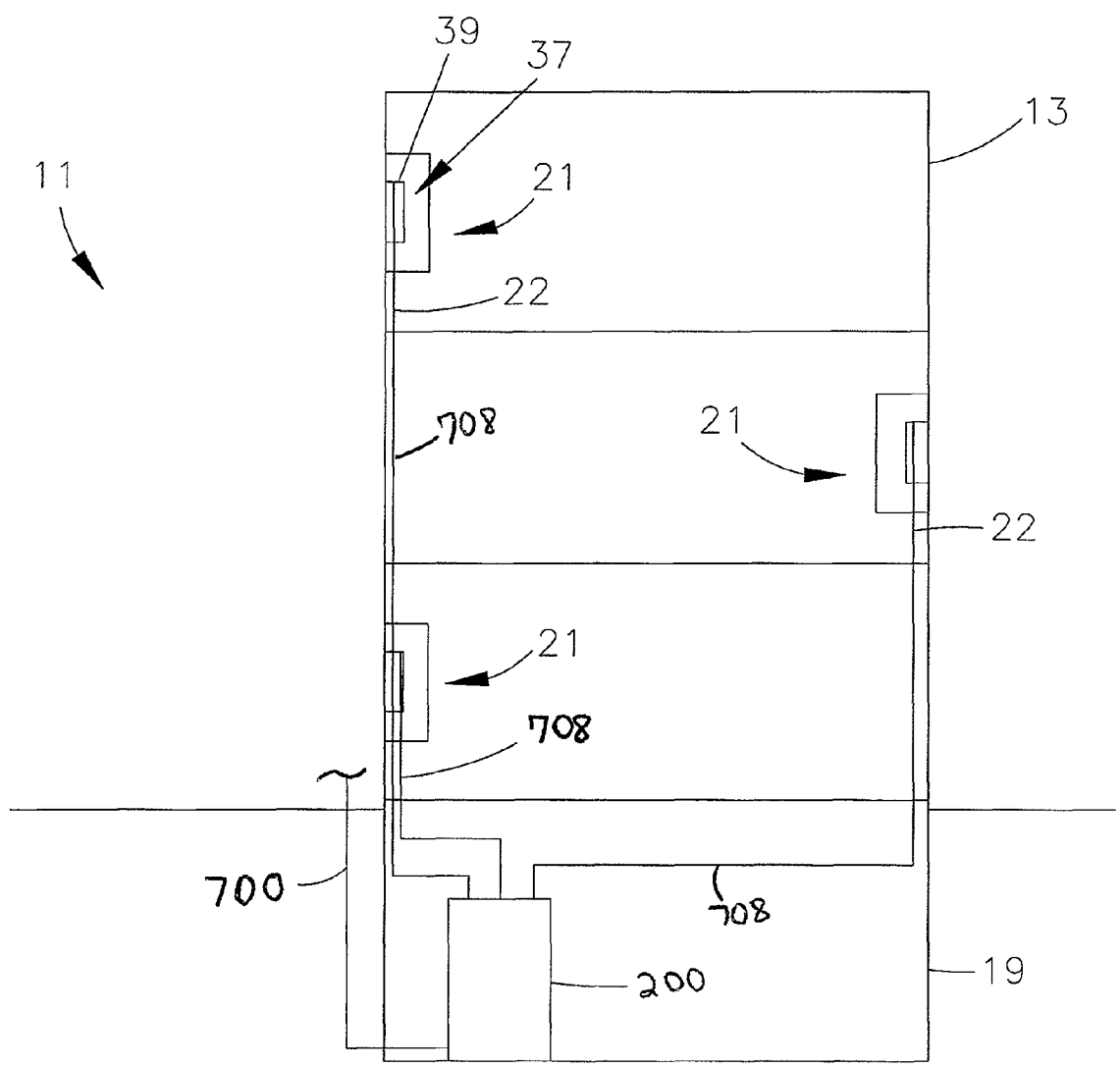
FIG. 4 is a schematic view of a fiber optic distribution system including a fiber distribution hub.

The terminated incoming fibers are typically arranged in a feeder cable 700, and the terminated outgoing fibers are typically arranged in one or more subscriber cables 708. Signals transmitted by the feeder cable 700 and the subscriber cable 708 can be sent from the central office 110 to the subscriber 115 and/or to the central office 110 from the subscriber 115 and/or from the data center 420 to the subscriber 115, and/or from the central office 110 to the data center 420, etc. As illustrated at FIGS. 1-3, the feeder cable 700 and the subscriber cables 708 can be routed entirely indoors and thereby be protected from an outdoor environment. As illustrated at FIG. 4, the feeder cable 700 can be routed from the indoor FDH 200 through an indoor space and then into the outdoor environment. FIG. 4 also illustrates the subscriber cables 708 routed entirely within the indoor space.

FIGS. 1 and 2 illustrate a fiber optic distribution system 308 including a first FDH $200_1$, a second FDH $200_2$, and a third FDH 200₃. Other fiber optic distribution systems can include fewer than three FDHs or more than three FDHs. A first feeder cable 700₁ is routed between the first FDH 200₁ and a junction box 408 in the data center 420. Likewise, a second feeder cable 700₂ is routed between the second FDH 200₂ and the junction box 408, and a third feeder cable 700₃ is routed between the third FDH 200₃ and the junction box 408. The feeder cables 700₁, 700₂, 700₃ can have first ends 730 (see FIG. 7) that connect to the junction box 408. The junction box 408 or other structure at the data center 420 provides an interface between the feeder cables 700₁, 700₂ and 700₃ and cables 422 carrying signals to and from the central office 110.

The feeder cables 700₁, 700₂, 700₃ are shown running along substantially straight routes at FIGS. 1 and 2. In other installations, the feeder cables 700₁, 700₂, 700₃ can be routed along curved routes (e.g., over and around obstacles). The first, second, and third feeder cables 700₁, 700₂, and 700₃ have route lengths that vary. For example, the first feeder cable 700₁ has a route length L₁ that is longer than a route length L₃ of the third feeder cable 700₃.

FDHs in accordance with the present disclosure are adapted to hold and store the feeder cable 700 within a cabinet 201 of the FDH 200. A predetermined amount of feeder cable 700 can be stored within the FDH 200 before deployment and connection of the FDH 200 to the fiber optic distribution system 308. The feeder cable 700 can be paid out a length L to match the requirements of a given installation (see FIG. 7B). For example, in the installation of FIGS. 1 and 2, the feeder cable 700₁ of the first FDH 200₁ is paid out the length L₁, and the feeder cable 700₃ of the third FDH 200₃ is paid out the length L₃. A cable spool 900 is included to hold the feeder cable 700 (see FIGS. 6 and 7). In particular, the feeder cable 700 is wrapped around a hub 910 of the cable spool 900 (see FIG. 8) and the cable spool 900 is delivered to an installation location with the FDH 200. The cable spool 900 can be preassembled into the cabinet 201 of the FDH 200 before delivery (e.g., at a factory) or the cable spool 900 can be assembled into the cabinet 201 at the installation location. After the feeder cable 700 has been routed and the first end 730 has been connected (e.g., to the junction box 408 or other structure), any unused feeder cable 700 can remain on the cable spool 900 within the cabinet 201. In certain embodiments, the feeder cable 700 has a length in a range of about 400 feet to about 600 feet between the first end 730 and a second end 738. In other embodiments, the length of the feeder cable 700 ranges between about 200 feet and about 600 feet. In still other embodiments, the length of the feeder cable ranges between about 400 feet and about 1200 feet. In yet other embodiments, the length of the feeder cable has other dimensions. Additional details of the cable spool 900 are described below.

The FDH includes optical splitters for splitting an input optical signal (e.g., a signal carried by feeder cable 700) to a plurality of connectorized pigtails within the FDH. The FDH also includes a termination region including a plurality of fiber optic adapters. First ends of the fiber optic adapters receive connectors coupled to optical fibers corresponding to subscriber locations. Second ends of the fiber optic adapters receive the connectorized ends of the pigtails so that the connectorized pigtails are optically coupled to the optical filters corresponding to the subscriber locations. The FDH can also include a storage location where the connectorized ends of the connectorized pigtails can be held until it is desired to plug the connectorized ends of the connectorized pigtails into the second ends of the fiber optic adapters.

Figure 5:
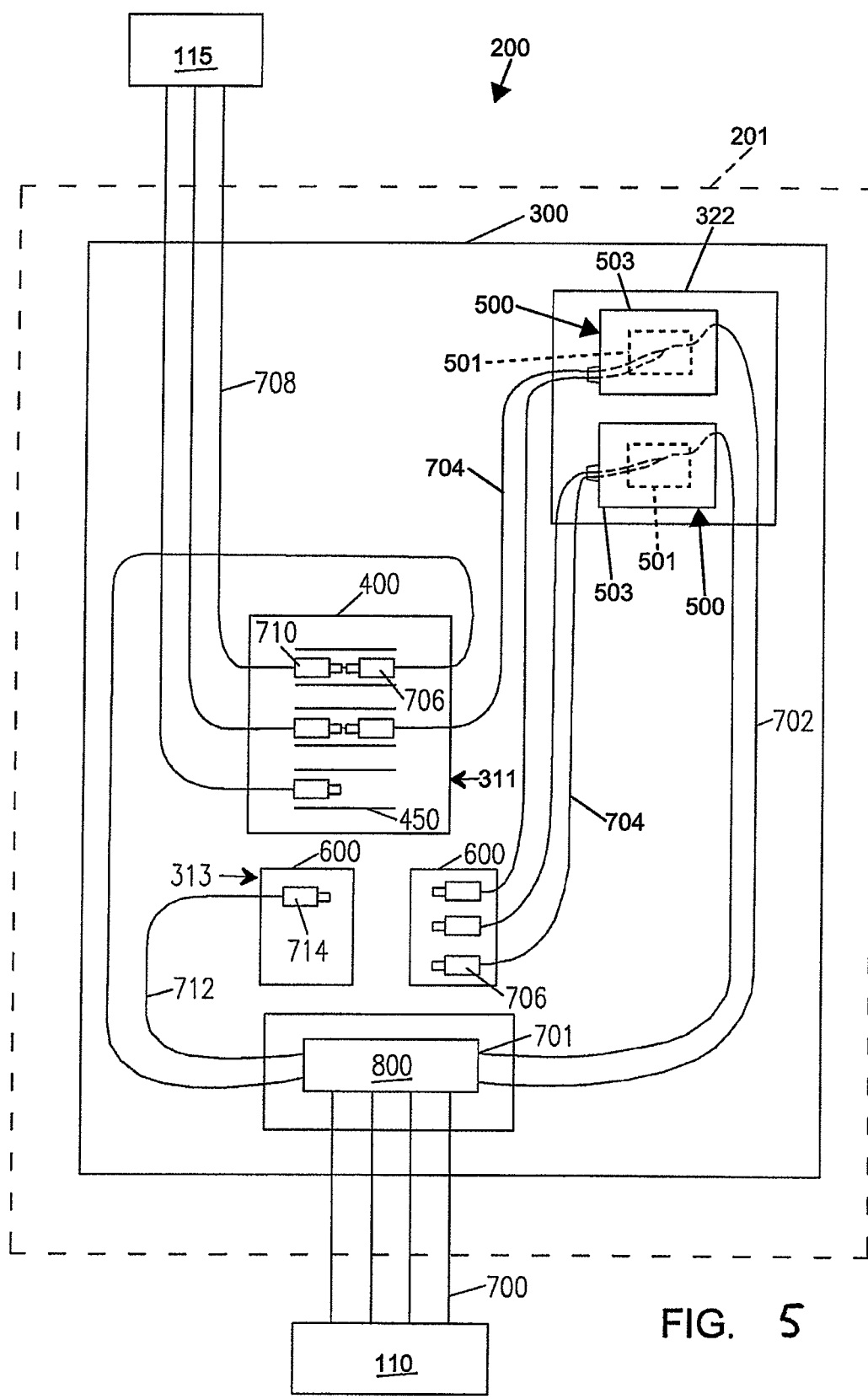
FIG. 5 is a schematic diagram showing an example cable routing scheme for a fiber distribution hub.

Turning now to the figures, FIG. 5 is a schematic diagram showing an example cable routing scheme for the example FDH 200. The FDH 200 generally administers connections at a termination region 311 between incoming fibers and outgoing fibers. The FDH 200 can be adapted for an Outside Plant (OSP) environment or for an Inside Plant (ISP) environment. The termination region 311 can be provided on a swing frame 300 that can swing (e.g., about a pivot axis) in and out relative to the cabinet 201 to provide enhanced access to the various components mounted on the swing frame 300.

As the term is used herein, "a connection" between fibers includes both direct and indirect connections. Examples of incoming fibers include the feeder cable 700 fibers that enter the FDH 200 and intermediate fibers (e.g., connectorized pigtails 704 extending from splitters 500 and patching fibers/jumpers) that connect the feeder cable 700 fibers to the termination region 311. Examples of outgoing fibers include subscriber cable 708 fibers that exit the FDH 200 and any intermediate fibers that connect the subscriber cable 708 fibers to the termination region 311. The FDH 200 provides an interconnect interface for optical transmission signals at a location in the fiber optic distribution system 308 (i.e., the network) where operational access and reconfiguration are desired. For example, as noted above, the FDH 200 can be used to split signals carried by the feeder cables 700 and connect the split signals to distribution cables 708 routed to the subscriber locations 115. In addition, the FDH 200 is designed to accommodate a range of alternative sizes and fiber counts and support factory installation of pigtails 704, fanouts, and splitters 500.

As shown at FIG. 5, the feeder cable 700 is initially routed into the example FDH 200 through the cabinet 201 (e.g., typically through the back, bottom or top of the cabinet. In certain embodiments, the fibers of the feeder cable 700 can include ribbon fibers. An example feeder cable 700 may include twelve to forty-eight individual fibers connected directly or indirectly to the service provider's central office 110. In certain embodiments, after entering the cabinet 201, the fibers of the feeder cable 700 are routed to a feeder cable interface 800 (e.g., fiber optic adapter modules, a splice tray, etc.) provided on the swing frame 300. At the feeder cable interface 800, one or more of the fibers of the feeder cable 700 are individually connected to ends 701 of separate splitter input fibers 702. The splitter input fibers 702 are routed from the feeder cable interface 800 to a splitter mounting location 322 on the swing frame 300 at which a plurality of splitter modules 500 can be mounted. Each splitter module 500 includes at least one fiber optic splitter 501 positioned within a splitter housing 503. At the splitter mounting location 322, the splitter input fibers 702 are optically connected to separate splitter modules 500, wherein the input fibers 702 are each split by the fiber optic splitters 501 of the splitter module 500 into multiple pigtails 704, each having a connectorized end 706. In other embodiments, however, the fibers of the feeder cable 700 can be connectorized and can be routed directly to the splitter modules 500 thereby bypassing or eliminating the need for an intermediate feeder cable interface 800. In such embodiments, the splitter mounting location can include adapters that connect the connectorized ends of the feeder cable fibers to splitter modules. An example splitter mounting location having this type of "plug-and-play" configuration is further disclosed at U.S. Pat. No. 7,418,181 that is hereby incorporated by reference in its entirety.

When the pigtails 704 are not in service, the connectorized ends 706 can be temporarily stored on a storage module 600 that is mounted at a storage region 313 of the swing frame 300. When the pigtails 704 are needed for service, the pigtails 704 are routed from the splitter modules 500 to a termination module 400 that is provided at the termination region 311 of the swing frame 300. At the termination module 400, the connectorized ends 706 of the pigtails 704 are connected to connectorized ends 710 of the fibers of the distribution cable 708 within adapters 450. The termination region 311 is the dividing line between the incoming fibers and the outgoing fibers. A typical distribution cable 708 includes a plurality of fibers that are routed from the FDH 200 to the subscriber locations 115.

In certain embodiments, one or more of the fibers of the feeder cable 700 are not connected to any of the splitter modules 500. Rather, these fibers of the feeder cable 700 are connected to pass-through fibers 712 having connectorized ends 714. The pass-through fibers 712 are connected to the termination modules 400, without first connecting to the splitter modules 500. By refraining from splitting the fiber 712, a stronger signal can be sent to one of the subscribers. The connectorized ends 714 of the pass-through fibers 712 can be stored at the storage region 313 when not in use.

The splitter modules 500 and storage modules 600 can be incrementally added to the swing frame 300. The connectorized pigtails 704 are typically stored in one or more storage modules 600 prior to installation on the swing frame 300. In certain embodiments, the connector 706 of each pigtail 704 is secured in a storage module 600 before the splitter module 500 leaves the factory.

In one embodiment, the storage module 600 is configured to hold fiber optic connectors while dust caps remain affixed over ferrules of the fiber optic connectors. Each storage module can be configured to hold a plurality of connectors 706 (e.g., a 4 pack, an 8 pack, a 12 pack, a 16 pack, etc.) More information regarding example storage modules 600 can be found at U.S. Pat. No. 7,198,409, issued on Apr. 3, 2007, entitled FIBER OPTIC CONNECTOR HOLDER AND METHOD; at U.S. Pat. No. 7,233,731, issued on Jun. 19, 2007, entitled TELECOMMUNICATIONS CONNECTION CABINET; and at U.S. Pat. No. 7,218,827, issued on May 15, 2007, entitled MULTI-POSITION FIBER OPTIC CONNECTOR HOLDER AND METHOD which are hereby incorporated by reference in their entirety.

Figure 6A:
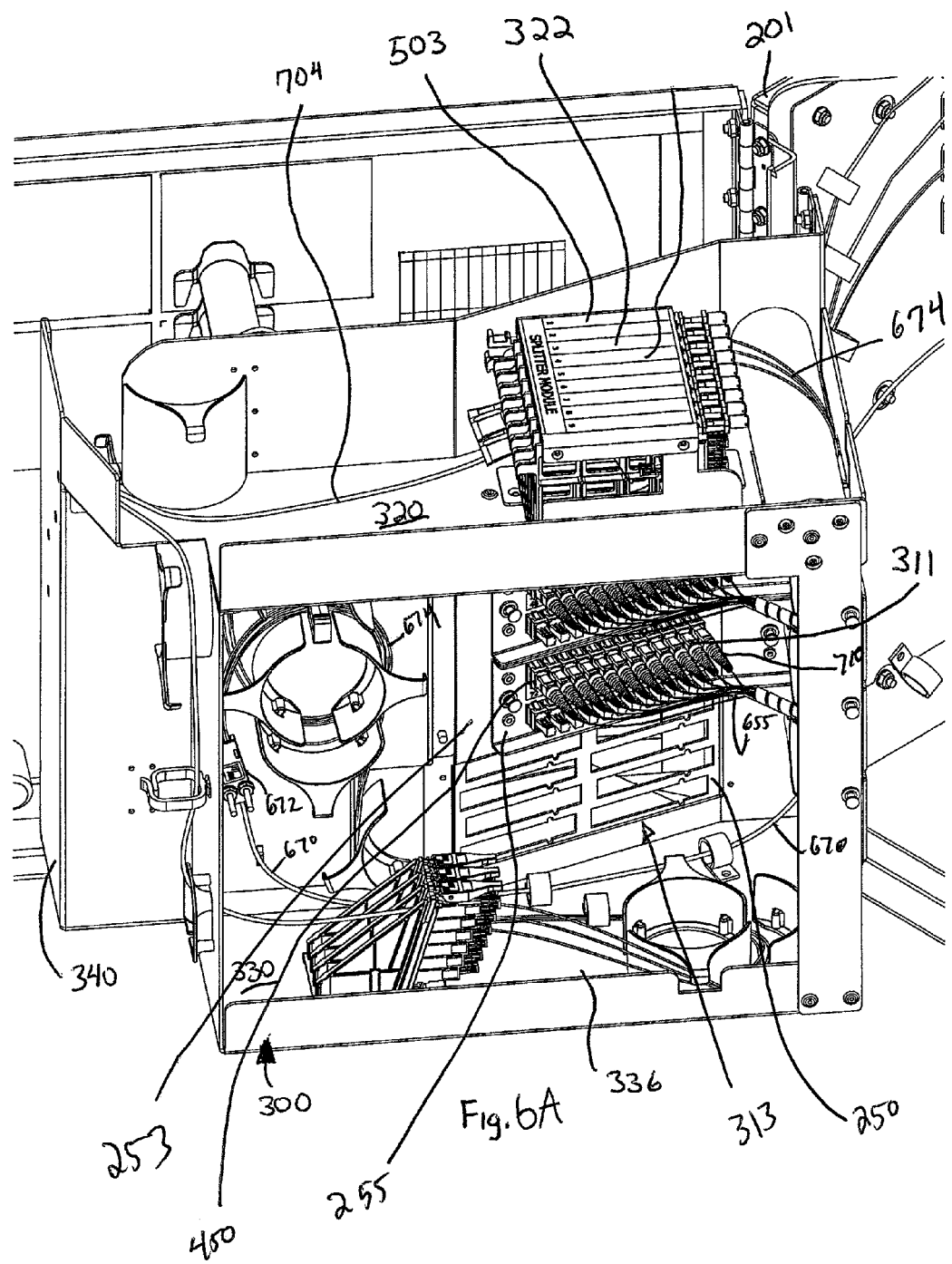
FIG. 6A is an enlarged portion of FIG. 6.
Figure 6B:
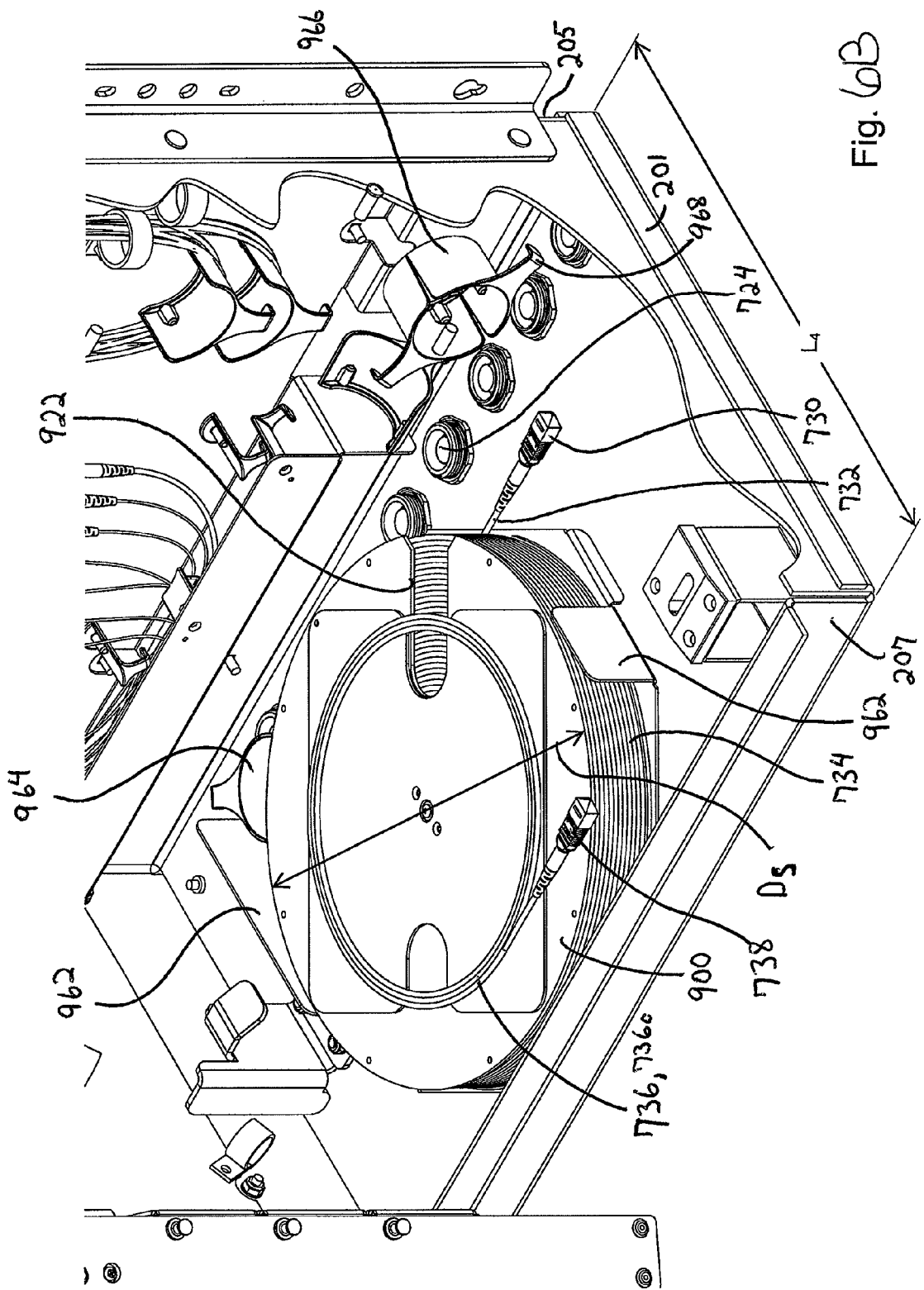
FIG. 6B is another enlarged portion of FIG. 6.

Referring now to FIGS. 6 and 7, the example cabinet 201 of the FDH 200 has a top panel 202, a bottom panel 203, a left side panel 204, a back panel 205, and a right side panel 206. At least one cabinet door 210 covers a cabinet access opening 208 on a front 207 of the cabinet 201 when the door 210 is closed. The door 210 can be rotatably mounted to the cabinet 201 by at least one hinge 214 and can be secured to the cabinet 201 by a door latch 211 when closed. As illustrated at FIG. 7, the top panel 202 is spaced from the bottom panel 203 by a length $L_6$ (e.g. a height). As illustrated at FIG. 6B, the front 207 is spaced from the back panel 205 by a length $L_4$ (e.g. a depth). As illustrated at FIG. 6C, the left side panel 204 is spaced from the right side panel 206 by a length $L_5$ (e.g. a width). The orientations top, bottom, left side, back, right side, and front depict a typical orientation of the cabinet 201 at a typical installation. The cabinet 201 can be oriented in any general manner as needed or desired.

As illustrated at FIG. 6, the cabinet 201 includes an opening 722 through which the feeder cable 700 (e.g., F1 cable) enters and another opening or openings 724 through which the subscriber cable or cables 708 exit the cabinet 201. The openings 722, 724 are shown on the top panel 202, but could also be provided at other locations of the cabinet 201.

Referring now to FIGS. 6 and 7, the swing frame 300 is pivotably mounted on hinges 315 within and to the cabinet 201 and supports the termination region 311 among other things. The hinges 315 define a vertical pivot axis about which the swing frame 300 can swing. The swing frame 300 is moveable between a stowed position inside the cabinet 201 and a service position (see FIGS. 6 and 7) outside the cabinet 201. The swing frame 300 is typically in the stowed position when the FDH 200 is in normal service and when the FDH 200 is being stored or transported (e.g., before the FDH 200 is initially installed). The swing frame 300 is typically moved to the service position when certain service operations are performed on the FDH 200 by the technician (e.g., when reconfiguring, adding, or removing the pigtails 704, the fanouts, the splitters 500, the feeder cable 700, the feeder cable interface 800, the splitter input fibers 702, etc.). After the service operation is completed, the swing frame 300 is typically returned to the stowed position. The swing frame 300 includes a top panel 320 at which the splitter mounting location 322 is located and a storage panel 250 that forms the connector storage location 313. The storage panel 250 includes openings 251 in which connector storage modules can be mounted. The swing frame also carries the termination region 311 and includes a panel 253 to which adapter modules 255 are mounted. Each adapter module 255 includes a plurality of the fiber optic adapters 450. Further details regarding swing frames, termination regions, storage panels, storage modules, and FDHs in general are disclosed at U.S. Pat. No. 7,720,343, issued May 18, 2010, entitled FIBER DISTRIBUTION HUB WITH SWING FRAME AND MODULAR TERMINATION PANELS, and at U.S. Pat. No. 7,369,741, issued May 6, 2008, entitled STORAGE ADAPTER WITH DUST CAP POSTS, which are hereby incorporated by reference in their entirety.

As illustrated at FIGS. 6 and 7, the swing frame 300 can be configured to swing over the cable spool 900 when moved between the stowed position and the service position. The cable spool 900 can thus be accessed by moving the swing frame 300 to the service position. The cable spool 900 can be installed and/or removed into/from the cabinet 201 by positioning the swing frame 300 at the service position. The feeder cable 700 can be paid out from/reeled by the cable spool 900 with the swing frame 300 at the service position, thus providing access to the cable spool 900 while paying out/reeling in. Alternatively, the feeder cable 700 can be paid out from/reeled in by the cable spool 900 with the swing frame 300 at the stowed position.

As mentioned above, the feeder cable 700 is wrapped around the cable spool 900 to both store the feeder cable 700 within the FDH 200 and to deploy the feeder cable 700 from the FDH 200. In particular, as illustrated at FIGS. 6 and 7, the feeder cable 700 extends from the first end 730 to the second end 738. In typical configurations of the FDH 200 before, during, and after deployment of the feeder cable 700, a first unwrapped portion 732 of the feeder cable 700 is adjacent the first end 730. The first unwrapped portion 732 continues on to a wrapped portion 734 of the feeder cable 700. The wrapped portion 734 can be wrapped around the cable spool 900 multiple times and can be attached to the hub 910 of the cable spool 900. Attachment means (e.g. attachment holes 912, a clip, etc.) can be provided on the hub 910 to attach an attached portion of the wrapped portion 734 of the feeder cable 700 to the hub 910. For example, a wire tie can be looped through one or more of the attachment holes 912 and drawn tight over the feeder cable 700 to secure the attached portion to the hub 910. The wrapped portion 734 of the feeder cable 700 continues on to a second unwrapped portion 736 adjacent the second end 738.

In certain embodiments, the wrapped portion 734 of the feeder cable 700 nearer the second end 738 is nearer the hub 910, and the wrapped portion 734 wraps upon itself and thereby cumulatively increases in distance from the hub 910 as the wrapped portion 734 approaches the first end 730. The feeder cable 700 can therefore be unwrapped by pulling on the first end 730 causing the cable spool 900 to rotate and transfer a portion of the wrapped portion 734 to the first unwrapped proton 732. This transferred portion typically comes from the wrapped portion 734 that is farthest from the hub 910. As the unwrapping continues, a diameter of the remaining wrapped portion decreases. If the unwrapping continues, all of the wrapped portion 734 can be transferred off of the cable spool 900 and the first and the second unwrapped portions 732, 736 can continue directly to each other.

In preferred embodiments, the second end 738 is accessible when the cable spool 900 is full of the feeder cable 700, when the cable spool 900 is empty, and when the cable spool 900 is partially filled with the feeder cable 700. A cable access opening 922 is preferably provided in a flange of the cable spool 900 to allow the second end 738 of the feeder cable 700 to be accessed, especially when the cable spool 900 is full or partially filled with the feeder cable 700. In FIGS. 6-8, the cable access opening 922 is shown in an open slot form. In other embodiments, the cable access opening 922 can take other forms (e.g. a closed slot, a circular hole, a spiraling slot, a grommet with strain relief, etc.). In the depicted embodiment, the cable access opening 922 is sufficiently near the hub 910 to allow the wrapped portion 734 of the feeder cable 700 to transition to the second unwrapped portion 736.

In certain embodiments, pulling on the second end 738 of the feeder cable 700 does not result in significant amounts of the feeder cable 700 transferring from the wrapped portion 734 to the second unwrapped portion 736. This effect can be at least partly caused by outer layers of the wrapped portion 734 covering inner layers of the wrapped portion 734 and thereby trapping (i.e., blocking) the inner layers from being unwrapped. As discussed in detail below, the second unwrapped portion 736 of the feeder cable 700 is typically used to route the feeder cable 700 from the cable spool 900 to internal fiber optic connections within the FDH 200. For example, the second unwrapped portion 736 can be connected to inputs of the splitter modules 500. To provide a suitable length of the feeder cable 700 for routing the second unwrapped portion 736, without transferring additional feeder cable 700 from the wrapped portion 734, a predetermined length of the feeder cable 700 can be extended through the cable access opening 922 prior to the wrapped portion 734 being wrapped around the cable spool 900. This predetermined length of the feeder cable 700 thus becomes the second unwrapped portion 736 after the wrapped portion 734 is wrapped. The second unwrapped portion 736 can be coiled into a coiled portion 736c and placed adjacent the cable spool 900 (e.g., on top of the cable spool 900 as shown at FIG. 6B). The feeder cable 700 can be secured to the attachment holes 912 of the hub 910 at a securing position near the cable access opening 922. The securing position can be at or near the transition of the feeder cable 700 from the wrapped portion 734 to the second unwrapped portion 736. The coiled portion 736c can be temporarily secured to the cable spool 900 (e.g., with attachment clips, wire ties, tape, etc.).

Figure 7A:
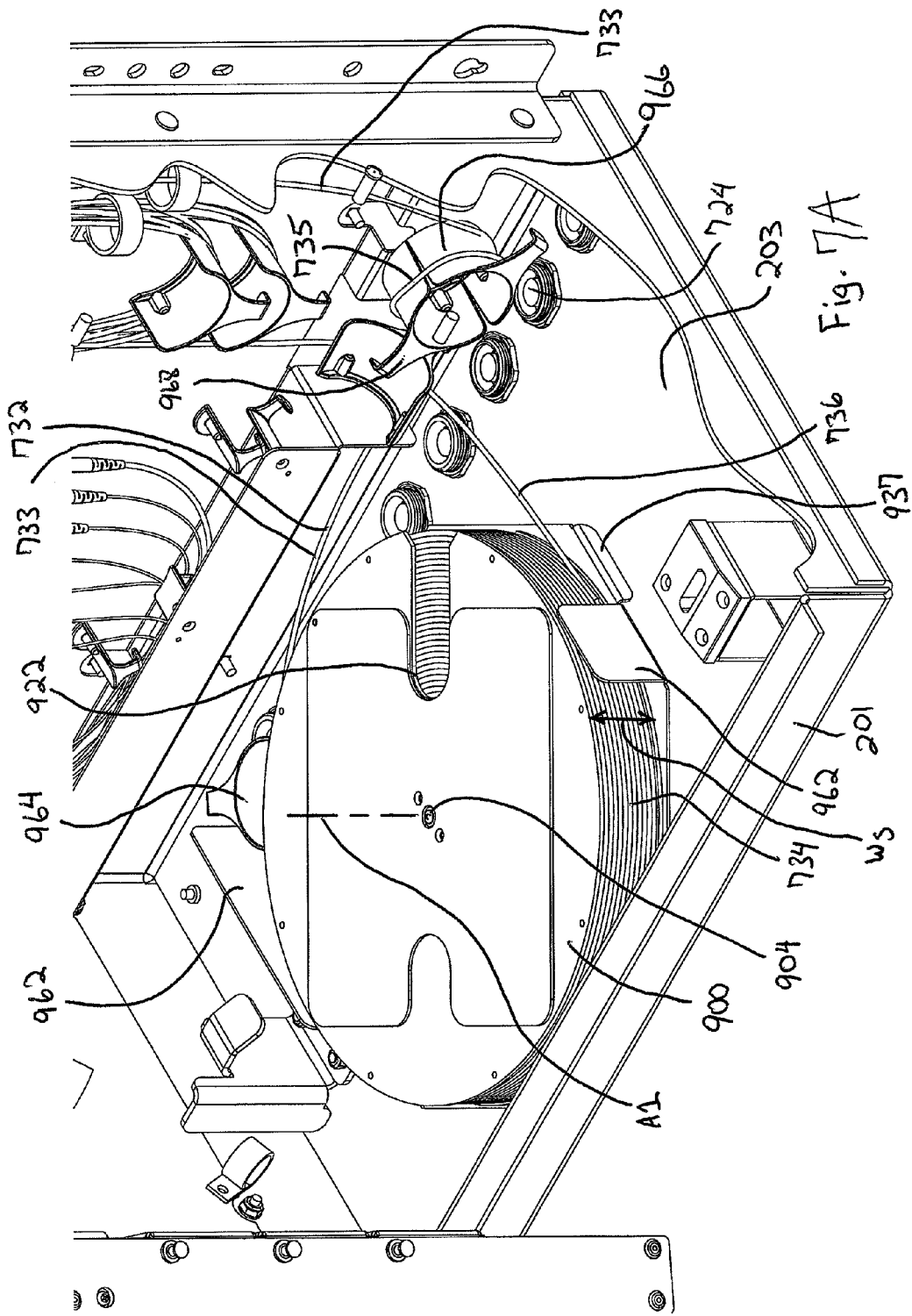
FIG. 7A is an enlarged portion of FIG. 7.

The cable spool 900 is preferably adapted to rotate within the cabinet 201 about an axis of rotation A1 (see FIGS. 7A and 8). In the depicted embodiment, the axis of rotation A1 is a vertical axis. In other embodiments, the axis of rotation A1 can have other orientations. As illustrated at FIG. 8, an axle 930 can be supported by a mounting base 902. The axle 930 can include a cylindrical outer surface 932 that engages a bearing 942 of a central member 940 of the cable spool 900. The cylindrical outer surface 932 is preferably axially aligned with the axis of rotation A1. The mounting base 902 can be secured and/or attached to the cabinet 201. In certain embodiments, the mounting base 902 is secured to the bottom panel 203 of the cabinet 201 at an attachment feature 934 (e.g., a slot, a hole, a clip, etc.). A fastener (e.g., a bolt, a nut and a stud, etc.) can join the attachment feature 934 to the cabinet 201. In certain embodiments, as illustrated at FIG. 8, the attachment feature 934 is spaced from a base plate 938 of the mounting base 902 by a standoff 936. By spacing the attachment feature 934 a distance away from the base plate 938, a head of the fastener can be recessed below the mounting base 902 and thereby avoid interfering with the rotation of the cable spool 900. The standoff 936 can also serve as a foot of the mounting base. One or more feet 937 can be included on the mounting base 902 to further stabilize the mounting base 902 when installed in the cabinet 201. The mounting base 902 can be installed into the cabinet 201 prior to the cable spool 900. Alternatively, the mounting base 902 can be preassembled to the cable spool 900 and the mounting base 902/cable spool 900 assembly can be installed into the cabinet 201 as a unit. By installing the bearing 942 of the cable spool 900 onto the axle 930 of the mounting base 902, the cable spool 900 is rotatably mounted about the axis of rotation A1.

Internal threads 933 can be included within the axle 930. The internal threads 933 can be adapted to engage a spool retainer 904 (e.g., a screw, a clamp, etc.). By inserting the spool retainer 904 through an opening 952 of the cable spool 900 and threading the spool retainer 904 into the internal threads 933 of the axle 930, the cable spool 900 is rotatably retained on the axle 930. The spool retainer 904 and the internal threads 933 can be axially aligned with the axis of rotation A1. The cable spool 900 and the spool retainer 904 can be configured to allow the spool retainer 904 to clamp against the cable spool 900 and thereby prevent the cable spool 900 from rotating. For example, by sufficiently tightening the spool retainer 904 into the internal threads 933 of the axle 930, the spool retainer 904 can be drawn against the cable spool 900. In addition, tightening the spool retainer 904 can draw the cable spool 900 against the base plate 938 of the mounting base 902. Friction between the spool retainer 904 and the cable spool 900 and/or friction between the base plate 938 and the cable spool 900, when the spool retainer 904 is tightened, can produce a locked configuration. The spool retainer 904 can be set to an unlocked configuration by partially unscrewing the spool retainer 904 from the internal threads 933 of the axle 930.

One or more unraveling guards 962 can be included to prevent the feeder cable 700 from unraveling on the cable spool 900. In certain embodiments, the unraveling guards 962 can be integrated with the mounting base 902 (see FIG. 8). The unraveling guards 962 can be positioned radially outward from an outer spool diameter Ds and/or an outer perimeter of the cable spool 900 (see FIG. 6B). The unraveling guards 962 can substantially extend across a width Ws of the cable spool 900 (see FIG. 7A). The unraveling guards 962 can have a tangential orientation with respect to the outer spool diameter Ds. The unraveling guards 962 are preferably oriented with the tangential orientation and also are generally parallel with the feeder cable 700 as it comes off of the cable spool 900 to be routed through the FDH 200.

A first cable guide 964 and a second cable guide 966 can be included in a cable guide set (see FIGS. 6B and 7A) within the FDH 100. The cable guide set is adapted to guide and route the first unwrapped portion 732 of the feeder cable 700 from the internal spool 900 to the opening 722 (i.e., an entrance/exit location) on the cabinet 201. A routed portion 733 (see FIGS. 7A and 7B) of the first unwrapped portion 732 of the feeder cable 700 is routed by the cable guide set as it is transferred to a deployed portion 731 (see FIG. 7B) of the first unwrapped portion 732 and is thereby deployed external to the cabinet 201. The deployed portion 731 of the first unwrapped portion 732 of the feeder cable 700 can be extended to the desired extension length L by pulling the deployed portion 731 away from the cabinet 201. This pulling rotates the cable spool 900 and transfers at least some of the desired extension length L from the wrapped portion 734 through the cable guide set.

The first cable guide 964 can be mounted to the cabinet 201 and adapted to guide the feeder cable 700 as it is transferred between the wrapped portion 734 on the cable spool 900 and the routed portion 733. The second cable guide 966 can be mounted to the cabinet 201 and adapted to guide the routed portion 733 of the feeder cable 700 as it is transferred between the first cable guide 964 and the opening 722 on the cabinet 201. The opening 722 can be adapted to guide the feeder cable 700 as it is transferred between the routed portion 733 and the deployed portion 731. The routed portion 733 of the feeder cable 700 can include a first leg, a second leg, and a third leg. The first leg can be positioned substantially tangential to the cable spool 900 and the first cable guide 964. The second leg can be positioned substantially tangential to the first cable guide 964 and the second cable guide 966. The third leg can be positioned substantially tangential to the second cable guide 966 and can extend to the opening 722.

The second unwrapped portion 736 and the second end 738 of the feeder cable 700 preferably rotate with the cable spool 900 while the deployed portion 731 of the first unwrapped portion 732 of the feeder cable 700 is extended. The second unwrapped portion 736 of the feeder cable 700 can be routed from the cable access opening 922 of the cable spool 900 to the feeder cable interface 800, and the second end 738 of the feeder cable 700 can be connected to a fiber optic adapter 802 (see FIG. 7B) of the feeder cable interface 800 after the deployed portion 731 of the feeder cable 700 has been extended to the desired extension length L. The second end 738 of the feeder cable 700 is preferably disconnected from the fiber optic adapter 802 and is carried by the flange of the cable spool 900 when the cable spool 900 is rotating thereby preventing the feeder cable 700 from axially winding-up. After the feeder cable 700 has been extended to the desired extension length L, an anchoring portion 735 of the routed portion 733 can be wrapped one or more times around the second cable guide 966 as illustrated at FIG. 7A. By wrapping the anchoring portion 735 around the second cable guide 966, the feeder cable 700 is anchored to the FDH 200. The second cable guide 966 is adapted to anchor tensile loads applied on the deployed portion 731 of the feeder cable 700.

In addition to the first cable guide 964 and the second cable guide 966, the cable guide set can include the opening 722 on the cabinet 201 and the unraveling guards 962. The first cable guide 964 can be included on the mounting base 902. The first and the second cable guides 964, 966 can include fingers 968 to aid in keeping the feeder cable 700 positioned on the cable guides 964, 966. The first and the second cable guides 964, 966 preferably have a coefficient of friction suitable for pulling the feeder cable 700 through the routed portion 733 without binding. In certain embodiments, the first and the second cable guides 964, 966 include a generally cylindrical portion and can be rotatably mounted to the FDH 200 (e.g., with bearings).

In certain embodiments of the present disclosure, a ratio between the outer spool diameter Ds and the length $L_4$ (e.g. the depth) is greater than about three-quarters. In other embodiments, the ratio between the outer spool diameter Ds and the length $L_4$ is greater than about one-half. In certain embodiments of the present disclosure, a ratio between the outer spool diameter Ds and the length $L_5$ (e.g. the width) is greater than about one-half. In other embodiments, the ratio between the outer spool diameter Ds and the length $L_5$ is greater than about one-third.

FIG. 8 further illustrates certain aspects of the cable spool 900. In particular, the depicted cable spool 900 includes a first and a second spool side member 914*a*, 914*b* (e.g., a disk, a flange, a plate, etc.). The first and the second spool side members 914*a*, 914*b* are positioned opposite each other on the hub 910 with the first spool side member 914*a* adjacent a first end 924 of the hub 910 and the second spool side member 914*b* adjacent a second end 926 of the hub 910. The first and the second ends 924, 926 of the hub 910 include notches 928 that engage fingers 920 of the first and the second spool side members 914*a*, 914*b* respectively. The first and the second spool side members 914*a*, 914*b* can be axially positioned on the hub 910 by the fingers 920 abutting bottoms of the notches 928. The cable access opening 922 can be included on the first spool side member 914*a* and on the second spool side member 914*b*. The first and the second spool side members 914*a*, 914*b* include an outer perimeter 918 and a central opening 916. In the depicted embodiment, the outer perimeter 918 is generally circular and the cable access opening 922 is in a form of a slot that is open to the outer perimeter 918. In the depicted embodiment, the central opening 916 is generally circular and includes one or more of the fingers 920.

The central member 940 of the cable spool 900 is positioned within the hub 910. The central member 940 includes the bearing 942, as mentioned above, a drive engagement feature 944 (e.g., a slot, a hex, flats, a spline, etc.), a first mounting surface 946, a second mounting surface 948, and fastener holes 950. A first and a second outer member 970*a*, 970*b* (e.g., a plate, a flange, a disk, etc.) are attached to the central member 940. In particular, the first outer member 970*a* includes fastener holes 974 that are positioned adjacent the fastener holes 950 of the first mounting surface 946 of the central member 940. Fasteners (not shown), inserted through the fastener holes 974, 950, join the first outer member 970*a* to the first mounting surface 946. Likewise, the second outer member 970*b* includes additional fastener holes 974 that are positioned adjacent the fastener holes 950 of the second mounting surface 948 of the central member 940. Additional fasteners (not shown), inserted through the fastener holes 974, 950, join the second outer member 970*b* to the second mounting surface 948. The first and the second outer members 970*a*, 970*b* includes one or more openings 972 (e.g., slots, notches, holes, etc.). The openings 972 can be aligned with the cable access opening 922, as depicted at FIG. 8, with the first outer member 970*a* and the first spool side member 914*a*. Alternatively, the openings 972 can be positioned away from the cable access opening 922 as depicted with the second outer member 970*b* and the second spool side member 914*b*. When the openings 972 are positioned away from the cable access opening 922, the cable access opening 922 can be blocked or partially blocked by the outer member 970*a*, 970*b*. The first and the second outer members 970*a*, 970*b* can each include one of the opening 952 of the cable spool 900. The hub 910 and the first and the second spool side members 914*a*, 914*b* can be sandwiched by the first and the second outer members 970*a*, 970*b*.

The drive engagement feature 944 can be used to reel in and/or wrap the feeder cable 700 onto the spool 900. This includes reeling in the deployed portion 731 of the feeder cable 700. In the depicted embodiment, this can be accomplished by removing the spool retainer 904 from the opening 952 of the cable spool 900. A drive tool (not shown) can then be inserted through the opening 952 and engage the drive engagement feature 944. The drive tool can be a battery powered drill, a hand crank, or other conventional device that can rotationally drive the drive engagement feature 944.

The hub 910 of the cable spool 900 defines an outer radius that is equal to or exceeds the minimum bend radius of the feeder cable 700.

The ends of the feeder cable 700 and other cables illustrated with the FDH 200 can be multi-fiber fiber optic cables that are terminated with multi-fiber connectors.

In the depicted embodiments, the feeder cable 700 is a multi-fiber cable terminated at each end by a multi-fiber connector. In one embodiment, the feeder cable 700 can include 12 fibers and the multi-fiber connectors can be 12 fiber multi-fiber connectors. A typical multi-fiber connector includes a housing supporting a ferrule in which the ends of the optical fibers are secured. The multi-fiber connector also includes a retractable release sleeve for facilitating releasing the multi-fiber connector from a fiber optic adapter that configured for receiving the multi-fiber connector.

Referring to FIG. 7B, the fiber distribution hub includes an adapter mounting plate 650 mounted to the back wall 205 of the fiber distribution hub. A plurality of fiber optic adapters 802 are mounted to the adapter mounting plate 650. Each of the fiber optic adapters 802 is adapted to receive and mechanically couple together two multi-fiber connectors such that optical signals can be transferred between the multi-fiber connectors.

Referring to FIG. 6A, the termination region 311 includes a plurality of the fiber optic adapters 450. A plurality of connectors 710 are inserted within rear ports of the fiber optic adapters. The rear fiber connectors terminate optical fibers 655 that are routed to fanouts where the fibers are ribbonized and upjacketed. The ribbonized and upjacketed fibers extend from the fanouts to multi-fiber connectors $654_{d1}$ inserted in the fiber optic adapters 802 mounted at the adapter mounting plate 650. As shown at FIGS. 6C and 7B, the multi-fiber connectors $654_{d1}$ plug into the bottom sides of the adapters 802 and are optically connected to multi-fiber connectors $654_{d2}$ terminating the ends of multi-fiber distribution cables 708. The multi-fiber distribution cables are routed up over bend radius limiters 656, down under additional bend radius limiters 658 and then out through distribution cable ports 724 provided through the top wall of the cabinet. The distribution cables 708 can be routed to subscriber locations.

A multi-fiber connector $654_{F1}$ positioned at the first end 738 of the feeder cable 700 can be routed from the spool 900 to the top port of one of the fiber optic adapters 802 provided on the adapter mounting plate 650 provided at the rear wall of the fiber distribution hub. The fiber optic adapter 802 couples the multi-fiber connector $654_{F1}$ terminating the end 738 of the cable 700 to a multi-fiber connector $654_s$ terminating at the end of an intermediate cable 678 that is routed from the adapter 802 to a fanout location 672. At the fanout location, ribbonized fibers of the cable 670 are separated and individually upjacketed to provide upjacketed fibers 674. Each of the fibers 674 is terminated with a separate connector that can be routed to fiber optic adapters provided at the splitter module mounting location 322 such that the fibers 674 are optically connected to the splitters of splitter modules mounted at the splitter module mounting location 322.

To deploy the feeder cable 700, the fibers distribution hub 200 can be mounted at a desired location with the spool filled with the feeder cable 700 mounted therein. With the fiber distribution hub 200 at the desired mounting location, the end 730 of the feeder cable 700, which includes multi-fiber connector $654_{F2}$, can be routed within the cabinet and directed out through the port 722. By pulling on the end 730, the spool 900 spins to allow the feeder cable 700 to be paid off from the spool. This allows the installer to walk with the end 730 of the feeder cable 700 along the desired routing path. As the installer walks or otherwise moves, the spool 900 continues to spin to allow the feeder cable 700 to paid out. Once the installer reaches the end of the routing path, the end 730 can be terminated to a desired termination location. For example, the multi-fiber connector $654_{F2}$ can be plugged into a fiber optic adapter provided at the data center. In this way, the multi-fiber connector $654_{F2}$ at the end 730 of the cable 700 can be connected to a corresponding multi-fiber fiber optic connector terminating the end of a fiber optic cable optically connected to the central office or other location.

The above specification provides examples of how certain inventive aspects may be put into practice. It will be appreciated that the inventive aspects may be practiced in other ways than those specifically shown and described herein without departing from the spirit and scope of the inventive aspects.

What is claimed is:

1. A fiber distribution hub comprising:
   a cabinet with a first side, the cabinet including at least one door mounted on the first side;
   an entrance location on the cabinet for a fiber optic feeder cable;
   a swing frame mounted within the cabinet, the swing frame being moveable between a stowed position and a service position, the swing frame including a fiber termination region;
   an internal spool adapted to rotate within the cabinet about an axis of rotation, the internal spool including a hub and a cable access opening; and
   a fiber optic cable including a first end, a first portion, a second portion, and a second end, the first portion of the fiber optic cable terminated at the first end of the fiber optic cable, the second portion of the fiber optic cable terminated at the second end of the fiber optic cable, the fiber optic cable continuing from the first portion of the fiber optic cable to the second portion of the fiber optic cable, a wrapped portion of the first portion of the fiber optic cable wrapped around the hub of the internal spool, and the second portion of the fiber optic cable being accessible for routing within the cabinet via the cable access opening of the internal spool.

2. The fiber distribution hub of claim 1, further comprising an axle adapted to rotatably mount the internal spool, the axle including an axle axis, the axis of rotation of the internal spool aligned with the axle axis when the internal spool is rotatably mounted on the axle.

3. The fiber distribution hub of claim 2, further comprising a retaining fastener aligned with the axle axis, the retaining fastener adapted to retain the internal spool on the axle axis.

4. The fiber distribution hub of claim 3, wherein the retaining fastener includes a locked configuration and an unlocked configuration, wherein the internal spool is prevented from rotating relative to the cabinet when the retaining fastener is in the locked configuration, and wherein the internal spool can rotate relative to the cabinet about the axis of rotation when the retaining fastener is in the unlocked configuration.

5. The fiber distribution hub of claim 1, further comprising an unraveling guard positioned adjacent an outer perimeter of the internal spool, the unraveling guard adapted to prevent substantial unraveling of the wrapped portion of the first portion of the fiber optic cable from the internal spool.

6. The fiber distribution hub of claim 1, further comprising a cable guide set adapted to guide and route the first portion of the fiber optic cable from the internal spool to the entrance location on the cabinet, wherein a routed portion of the first portion of the fiber optic cable is routed by the cable guide set and a deployed portion of the first portion of the fiber optic cable is deployed external to the cabinet.

7. The fiber distribution hub of claim 6, wherein the fiber optic cable is the fiber optic feeder cable.

8. The fiber distribution hub of claim 6, wherein the deployed portion of the first portion of the fiber optic cable can be extended by a desired extension length by pulling the deployed portion away from the cabinet thereby rotating the internal spool and transferring the desired extension length from the wrapped portion through the cable guide set.

9. The fiber distribution hub of claim 8, wherein the internal spool includes a drive coupling adapted for rotational connection with a drive, wherein the deployed portion of the first portion of the fiber optic cable can be retracted by a desired retraction length by engaging the drive and the drive coupling of the internal spool and thereby rotating the internal spool and wrapping and transferring the desired refraction length of the first portion of the fiber optic cable to the wrapped portion on the internal spool.

10. The fiber distribution hub of claim 8, wherein the second portion and the second end of the fiber optic cable rotate with the internal spool while the deployed portion of the first portion of the fiber optic cable is extended.

11. The fiber distribution hub of claim 10, wherein the second portion of the fiber optic cable can be routed from the cable access opening of the internal spool to a feeder cable interface and the second end of the fiber optic cable can be connected to a fiber optic adapter of the feeder cable interface after the deployed portion of the first portion of the fiber optic cable has been extended by the desired extension length.

12. The fiber distribution hub of claim 6, wherein the cable guide set includes a first guide, a second guide, and the entrance location on the cabinet, the first guide mounted to the cabinet and adapted to guide the fiber optic cable when transferred between the wrapped portion on the internal spool and the routed portion, the second guide mounted to the cabinet and adapted to guide the routed portion of the fiber optic cable when transferred between the first guide and the entrance location, and the entrance location adapted to guide the fiber optic cable when transferred between the routed portion and the deployed portion.

13. The fiber distribution hub of claim 12, wherein the routed portion of the fiber optic cable includes a first leg, a second leg, and a third leg, the first leg positioned substantially tangential to the internal spool and the first guide, the second leg positioned substantially tangential to the first guide and the second guide, and the third leg positioned substantially tangential to the second guide and extending to the entrance location.

14. The fiber distribution hub of claim 12, wherein an anchoring portion of the fiber optic cable can be formed by wrapping the fiber optic cable one or more times around the second guide of the cable guide set and wherein the second guide is adapted to anchor tensile loads applied to the deployed portion of the fiber optic cable.

15. The fiber distribution hub of claim 1, wherein the cabinet includes a second side perpendicular to the first side, wherein the internal spool is rotatably mounted to the second side of the cabinet.

16. The fiber distribution hub of claim 15, wherein the second side of the cabinet is a bottom side.

17. The fiber distribution hub of claim 16, wherein the swing frame is positioned above the internal spool.

18. The fiber distribution hub of claim 17, wherein the internal spool is accessible through the door of the cabinet when the door is open and the swing frame is at the service position.

19. The fiber distribution hub of claim 1, wherein the axis of rotation of the internal spool is substantially vertical.

20. The fiber distribution hub of claim 1, wherein the hub of the internal spool includes a cable attachment location and wherein the fiber optic cable is attached to the hub at the cable attachment location.

21. The fiber distribution hub of claim 20, wherein a cable tie at the cable attachment location attaches the fiber optic cable to the hub.

22. The fiber distribution hub of claim 1, wherein the fiber distribution hub is an indoor fiber distribution hub.

23. A fiber distribution hub comprising:
   a cabinet with a first side, the cabinet including at least one door mounted on the first side;
   a swing frame mounted within the cabinet, the swing frame being moveable between a stowed position and a service position, the swing frame including a fiber termination region;
   an internal spool adapted to rotate within the cabinet, the internal spool including a hub;
   a fiber optic feeder cable including a first end, a second end, and a wrapped portion between the first and the second ends wrapped around the hub of the internal spool; and
   an entrance location on the cabinet for the fiber optic feeder cable;
   wherein the fiber optic feeder cable can be deployed from the fiber distribution hub by rotating the first end of the fiber optic feeder cable through the entrance location on the cabinet and then pulling on the first end of the fiber optic feeder cable thereby rotating the internal spool and unwrapping at least a portion of the wrapped portion.

24. The fiber distribution hub of claim 23, wherein the cabinet includes a bottom side, wherein the internal spool is rotatably mounted to the bottom side of the cabinet.

25. The fiber distribution hub of claim 24, wherein the swing frame swings over a top of the internal spool when moved from the service position to the stowed position.

26. The fiber distribution hub of claim 25, wherein the internal spool is accessible through the door of the cabinet when the door is open and the swing frame is at the service position.

27. The fiber distribution hub of claim 23, wherein the first side of the cabinet extends between a second side and an opposite third side, wherein the second side is space from the third side by a distance, wherein a flange of the internal spool defines an outer diameter and is substantially perpendicular to the first and the second sides, and wherein a ratio of the outer diameter to the distance is greater than one-half.

28. The fiber distribution hub of claim 23, wherein the first side of the cabinet is space from an opposite second side by a distance, wherein a flange of the internal spool defines an outer diameter and is substantially perpendicular to the first side, and wherein a ratio of the outer diameter to the distance is greater than three-quarters.

29. A fiber distribution hub comprising:
   a cabinet;
   a termination region positioned within the cabinet;
   a multi-fiber fiber optic adapter positioned within the cabinet;
   a splitter module positioned within the cabinet, the splitter module including a plurality of output pigtails each terminated by a first optical connector, the first optical connectors being single fiber optical connectors;

a plurality of intermediate distribution fibers having first ends terminated by second optical connectors, the second optical connectors being adapted to be coupled to the first optical connectors at the termination region, the intermediate distribution fibers also including second ends adapted for connection to fibers of a distribution cable routed to subscriber locations, the second optical connectors being single fiber optical connectors;

a spool rotatably mounted within the cabinet;

a multi-fiber feeder cable wrapped around the spool, the multi-fiber feeder cable including a first end terminated by a first multi-fiber optical connector and a second end terminated by a second multi-fiber optical connector, the multi-fiber feeder cable being deployable from the fiber distribution hub by pulling the first end of the multi-fiber feeder cable from outside the cabinet thereby causing the spool to spin and allow the multi-fiber feeder cable to be paid out from the spool and routed outside the cabinet, a plurality of intermediate feeder fibers having first ends and second ends, the first ends of the intermediate feeder fibers being terminated by a third multi-fiber optical connector and at least one of the second ends of the intermediate feeder fibers being adapted for optical connection to an input of the splitter module; and wherein the second and third multi-fiber optical connectors are coupled together at the multi-fiber fiber optic adapter after the first end of the multi-fiber feeder cable has been deployed.

* * * * *